US011049652B2

(12) United States Patent
Mizuno

(10) Patent No.: US 11,049,652 B2
(45) Date of Patent: Jun. 29, 2021

(54) MULTI-LAYER CERAMIC CAPACITOR AND METHOD OF PRODUCING THE SAME

(71) Applicant: Taiyo Yuden Co., Ltd., Tokyo (JP)

(72) Inventor: Kotaro Mizuno, Tokyo (JP)

(73) Assignee: Taiyo Yuden Co., Ltd., Tokyo (JP)

(*) Notice: Subject to any disclaimer, the term of this patent is extended or adjusted under 35 U.S.C. 154(b) by 26 days.

(21) Appl. No.: 16/368,128

(22) Filed: Mar. 28, 2019

(65) Prior Publication Data

US 2019/0318872 A1   Oct. 17, 2019

(30) Foreign Application Priority Data

Apr. 11, 2018   (JP) .............................. JP2018-075880

(51) Int. Cl.
| | |
|---|---|
| *H01G 4/30* | (2006.01) |
| *H01G 4/12* | (2006.01) |
| *H01G 4/012* | (2006.01) |

(52) U.S. Cl.
CPC ............... *H01G 4/12* (2013.01); *H01G 4/012* (2013.01); *H01G 4/30* (2013.01)

(58) Field of Classification Search
None
See application file for complete search history.

(56) References Cited

U.S. PATENT DOCUMENTS

| | | | | |
|---|---|---|---|---|
| 2012/0127628 A1* | 5/2012 | Lee | ..................... | C04B 35/6342 361/321.4 |
| 2013/0340920 A1 | 12/2013 | Matsui et al. | | |
| 2015/0109718 A1* | 4/2015 | Choi | ........................ | H01G 4/12 361/304 |
| 2015/0340155 A1* | 11/2015 | Fukunaga | .............. | H01G 4/012 361/301.4 |
| 2016/0095223 A1* | 3/2016 | Yoshida | ................... | H01G 4/30 174/260 |
| 2017/0040112 A1* | 2/2017 | Tanaka | ................. | H01G 13/003 |

FOREIGN PATENT DOCUMENTS

JP        2012-209539 A     10/2012

* cited by examiner

*Primary Examiner* — Dion Ferguson
(74) *Attorney, Agent, or Firm* — Saliwanchik, Lloyd & Eisenschenk

(57) ABSTRACT

A multi-layer ceramic capacitor includes: a ceramic body including a multi-layer chip and a side margin, the multi-layer chip including a capacitance forming unit including internal electrodes laminated in a first direction, positions of end portions of the internal electrodes in a second direction orthogonal to the first direction being aligned with one another within a range of 0.5 μm, and a cover covering the capacitance forming unit in the first direction, the side margin covering the multi-layer chip in the second direction, the ceramic body having a main surface facing in the first direction, a side surface facing in the second direction, an end surface facing in a third direction orthogonal to the above directions, and a corner portion connecting those surfaces; and an external electrode covering the end surface and the corner portion, the corner portion having a surface roughness of 30 nm or more.

5 Claims, 13 Drawing Sheets

MULTI-LAYER CERAMIC CAPACITOR AND METHOD OF PRODUCING THE SAME

CROSS-REFERENCE TO RELATED APPLICATION

This application claims the benefit of Japanese Application No. 2018-075880, filed Apr. 11, 2018; which is hereby incorporated by reference in its entirety.

BACKGROUND

The present disclosure relates to a multi-layer ceramic capacitor including side margins and to a method of producing the multi-layer ceramic capacitor.

In recent years, along with miniaturization of electronic devices and achievement of high performance thereof, there have been increasingly strong demands for miniaturization and increase in capacitance with respect to multi-layer ceramic capacitors used in the electronic devices. In this regard, in order to sufficiently ensure an intersectional area of internal electrodes of the multi-layer ceramic capacitor and ensure high reliability, a technique of providing side margins in a later step is known.

Japanese Patent Application Laid-open No. 2012-209539 discloses the following technique: in a green chip in which internal electrodes are exposed from side surfaces thereof, each side surface is pressed against a ceramic green sheet for side surfaces to punch the ceramic green sheet, and a ceramic protective layer (side margin) is thus provided to the side surface.

SUMMARY

Additionally, in order to miniaturize the multi-layer ceramic capacitor, it is necessary to form thin external electrodes. There has been a case where when the outer edge of a side margin is not sufficiently chamfered at the time of formation of thin external electrodes, an electrically conductive paste for forming external electrodes fails to cover the outer edge.

Meanwhile, in a case where the thin external electrodes are formed, a distance from the surface of the multi-layer ceramic capacitor to the internal electrode is also shortened. For that reason, when the outer edge of the side margin is largely trimmed for the purpose of chamfering, there arises a concern that the internal electrodes are to be exposed. This has made it difficult to meet both of miniaturization and reliability.

In view of the circumstances as described above, it is desirable to provide a multi-layer ceramic capacitor having a small size, a large capacitance, and high reliability, and a method of producing the multi-layer ceramic capacitor.

According to an embodiment of the present disclosure, there is provided a multi-layer ceramic capacitor including a ceramic body and an external electrode.

The ceramic body includes a multi-layer chip and a side margin. The multi-layer chip includes a capacitance forming unit including internal electrodes laminated in a first direction, positions of end portions of the internal electrodes in a second direction being aligned with one another within a range of 0.5 μm in the second direction, the second direction being orthogonal to the first direction, and a cover that covers the capacitance forming unit in the first direction. The side margin covers the multi-layer chip in the second direction.

The ceramic body has a main surface facing in the first direction, a side surface facing in the second direction, an end surface facing in a third direction orthogonal to the first direction and the second direction, and a corner portion that connects the main surface, the side surface, and the end surface to one another.

The external electrode covers the end surface and the corner portion.

The corner portion has a surface roughness Ra of 30 nm or more.

In the multi-layer ceramic capacitor having the configuration described above, the corner portion of the ceramic body has minute irregularities such that the surface roughness Ra is set to 30 nm or more. Accordingly, it is possible to increase the coatability of the external electrode at the corner portion and inhibit the corner portion from being exposed from the external electrode, without trimming and largely rounding the corner portion. Therefore, it is possible to inhibit the internal electrodes from being exposed from the ceramic body by polishing or the like and also form a thin external electrode. In other words, it is possible to provide a multi-layer ceramic capacitor having a small size, a large capacitance, and high reliability.

For example, the external electrode has a thickness dimension along the third direction on the end surface, the thickness dimension being 10 μm or less.

Accordingly, it is possible to form an extremely thin external electrode and miniaturize the multi-layer ceramic capacitor. Further, in the multi-layer ceramic capacitor described above, since the corner portion of the ceramic body has the surface roughness Ra of 30 nm or more, it is possible to inhibit the corner portion from being exposed from the external electrode even if the external electrode is extremely thin.

Specifically, the side margin may have a thickness dimension along the second direction, the thickness dimension being 20 μm or less.

Further, the cover may have a thickness dimension along the first direction, the thickness dimension being 20 μm or less.

With those configurations, it is possible to increase the proportion of the capacitance forming unit in the ceramic body and miniaturize the multi-layer ceramic capacitor while obtaining a desired electrostatic capacitance. Further, it is possible to sufficiently ensure the coatability of the external electrode without largely trimming the corner portion of the ceramic body.

According to another embodiment of the present disclosure, there is provided a method of producing a multi-layer ceramic capacitor, the multi-layer ceramic capacitor including a ceramic body and an external electrode, the ceramic body having a main surface facing in a first direction, a side surface facing in a second direction orthogonal to the first direction, an end surface facing in a third direction orthogonal to the first direction and the second direction, and a corner portion that connects the main surface, the side surface, and the end surface to one another, the external electrode covering the end surface and the corner portion of the ceramic body, the method including: cutting a multi-layer sheet produced by laminating ceramic sheets in the first direction, the ceramic sheets including internal electrodes, to produce a multi-layer chip including a capacitance forming unit that includes the internal electrodes laminated in the first direction, a cover that covers the capacitance forming unit in the first direction, and a cut surface that faces in the second direction, end portions of the internal electrodes being exposed from the cut surface; pressing and punching a ceramic sheet for forming a side margin in the second direction by the cut surface of the multi-layer chip, to form a side margin on the cut surface of the multi-layer chip; sintering the multi-layer chip on which the side margin is formed, to produce the ceramic body in which the corner portion has a surface roughness Ra of 30 nm or more; and immersing the end surface and the corner portion of the ceramic body into an electrically conductive paste, to form the external electrode.

By the production method described above, the side margin is formed by pressing and punching a ceramic sheet for forming a side margin in the second direction by the cut surface of the multi-layer chip. The corner portion of the ceramic body, which is located at the outer edge of the side margin, is formed to have the surface roughness Ra of 30 nm or more on the basis of the shape of a shear surface of the ceramic sheet. Accordingly, it is possible to increase the coatability of the external electrode with respect to the ceramic body and achieve miniaturization, a large capacitance, and high reliability of a multi-layer ceramic capacitor.

Further, the multi-layer chip on which the side margin is formed may be subjected to barrel polishing and be sintered, to produce the ceramic body.

Accordingly, it is possible to chamfer the outer edge including the corner portion of the ceramic body and to inhibit the ceramic body from being damaged when the ceramic body comes into contact with another component or is handled.

As described above, according to the present disclosure, it is possible to provide a multi-layer ceramic capacitor having a small size, a large capacitance, and high reliability, and a method of producing the multi-layer ceramic capacitor.

These and other objects, features and advantages of the present disclosure will become more apparent in light of the following detailed description of embodiments thereof, as illustrated in the accompanying drawings.

DETAILED DESCRIPTION OF EMBODIMENTS

Hereinafter, an embodiment of the present disclosure will be described with reference to the drawings.

In the figures, an X axis, a Y axis, and a Z axis orthogonal to one another are shown as appropriate. The X axis, the Y axis, and the Z axis are common in all figures.

1. CONFIGURATION OF MULTI-LAYER CERAMIC CAPACITOR 10

Figure 1:
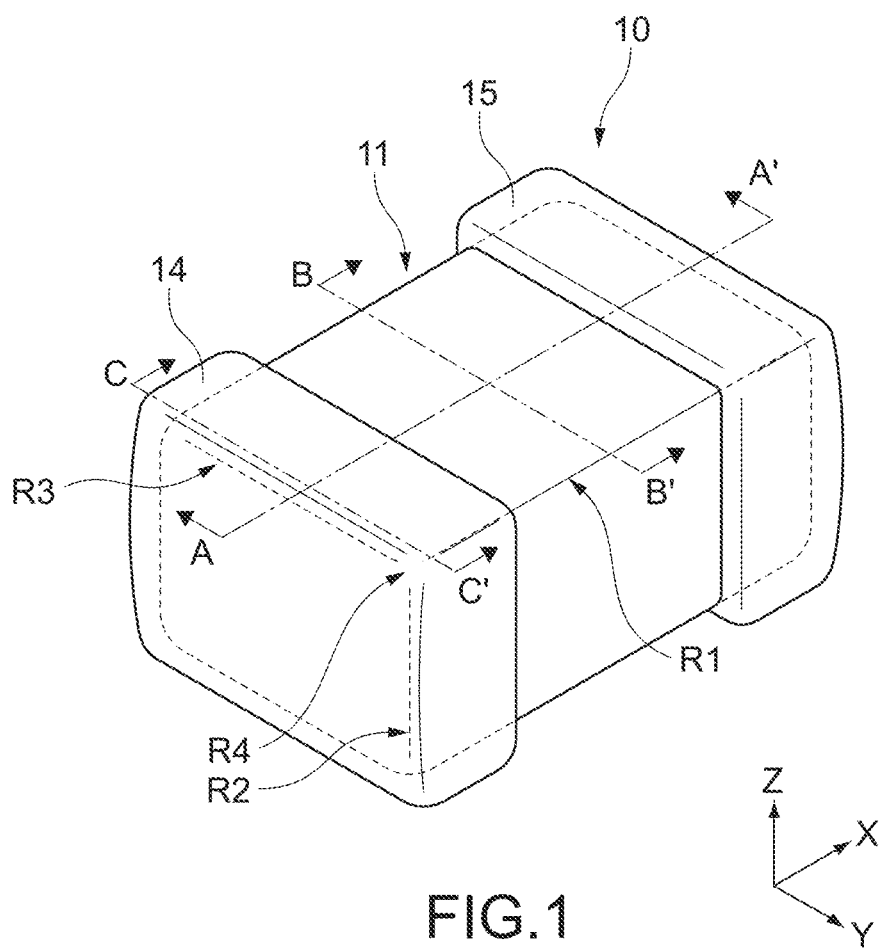
FIG. 1 is a perspective view of a multi-layer ceramic capacitor according to an embodiment of the present disclosure.
Figure 2:
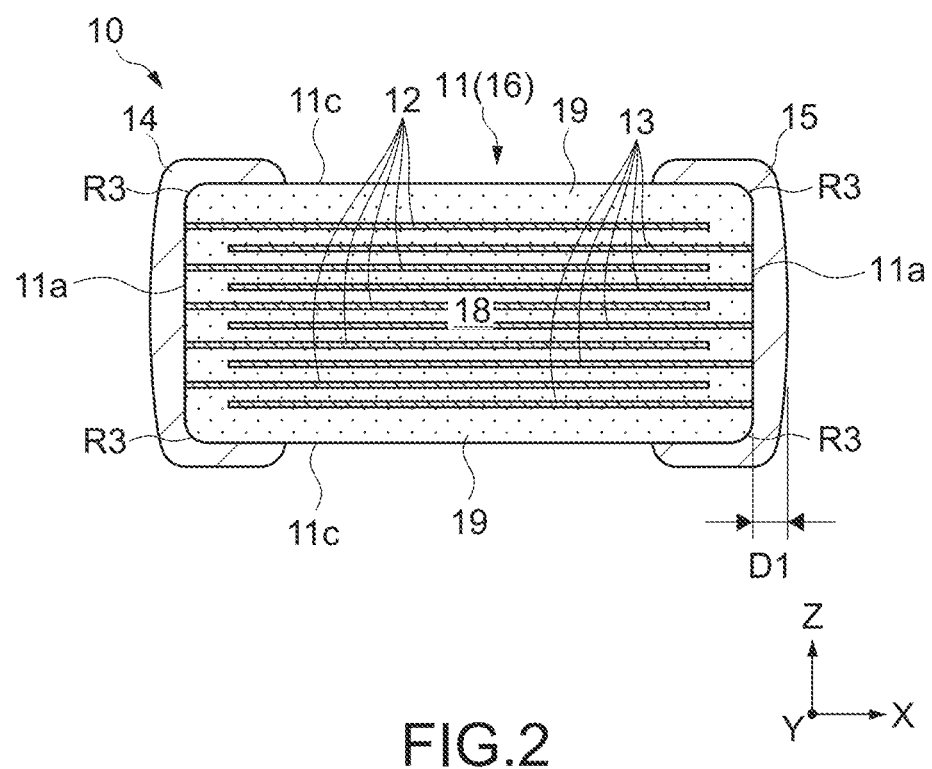
FIG. 2 is a cross-sectional view of the multi-layer ceramic capacitor taken along the A-A' line in FIG. 1.
Figure 3:
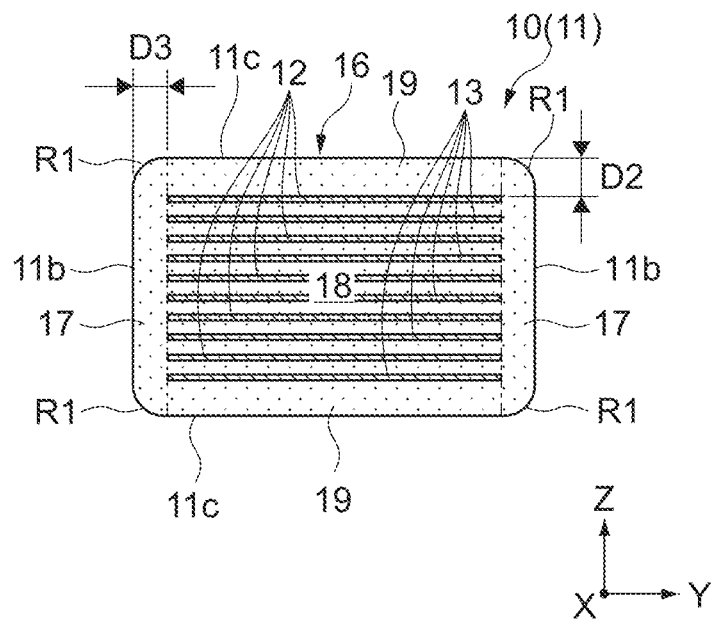
FIG. 3 is a cross-sectional view of the multi-layer ceramic capacitor taken along the B-B' line in FIG. 1.
Figure 4:
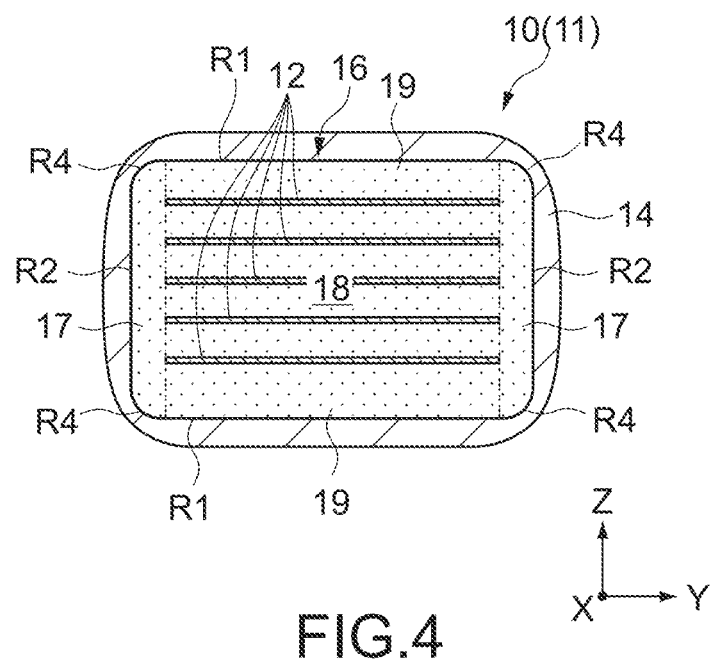
FIG. 4 is a cross-sectional view of the multi-layer ceramic capacitor taken along the C-C' line in FIG. 1.

FIGS. 1 to 3 each show a multi-layer ceramic capacitor 10 according to an embodiment of the present disclosure. FIG. 1 is a perspective view of the multi-layer ceramic capacitor 10. FIG. 2 is a cross-sectional view of the multi-layer ceramic capacitor 10 taken along the A-A' line in FIG. 1. FIG. 3 is a cross-sectional view of the multi-layer ceramic capacitor 10 taken along the B-B' line in FIG. 1. FIG. 4 is a cross-sectional view of the multi-layer ceramic capacitor 10 taken along the C-C' line in FIG. 1 and is also a view of the multi-layer ceramic capacitor 10 taken in the vicinity of an end surface 11a of a ceramic body 11 to be described later.

The multi-layer ceramic capacitor 10 includes a ceramic body 11, a first external electrode 14, and a second external electrode 15. The ceramic body 11 has two end surfaces 11a facing in the X-axis direction, two side surfaces 11b facing in the Y-axis direction, and two main surfaces 11c facing in the Z-axis direction.

The ceramic body 11 is chamfered and includes first ridge portions R1, second ridge portions R2, third ridge portions R3, and corner portions R4, which connect a plurality of surfaces to each other. This can inhibit the ceramic body 11 from being damaged when the ceramic body 11 comes into contact with another component or is handled, as compared to a case where a boundary between the plurality of surfaces is formed by a straight side.

The first ridge portions R1 each extend along the X-axis direction and connect two surfaces, i.e., the side surface 11b and the main surface 11c, to each other. The second ridge portions R2 each extend along the Z-axis direction and connect two surfaces, i.e., the side surface 11b and the end surface 11a, to each other. The third ridge portions R3 each extend along the Y-axis direction and connect two surfaces, i.e., the end surface 11a and the main surface 11c, to each other. The corner portions R4 each connect three surfaces, i.e., the end surface 11a, the side surface 11b, and the main surface 11c, to one another.

The first external electrode 14 and the second external electrode 15 face each other in the X-axis direction while sandwiching the ceramic body 11 therebetween. The first external electrode 14 and the second external electrode 15 cover the end surfaces 11a of the ceramic body 11 and corner portions R4 connected thereto and extend to the side surfaces 11b and the main surfaces 11c. With this configuration, both of the first external electrode 14 and the second external electrode 15 have U-shaped cross sections parallel to the X-Z plane and the X-Y plane.

A thickness dimension D1 of each of the first and second external electrodes 14 and 15 along the X-axis direction is 10 μm or less, for example. The thickness dimension D1 is a dimension along the X-axis direction from the center portion of the end surface 11a in the Y- and Z-axis directions to the surface of each of the first and second external electrodes 14 and 15.

The first and second external electrodes 14 and 15 are each made of a good conductor of electricity. Examples of the good conductor of electricity forming the first and second external electrodes 14 and 15 include a metal or alloy mainly containing copper (Cu), nickel (Ni), tin (Sn), palladium (Pd), platinum (Pt), silver (Ag), gold (Au), or the like.

The ceramic body 11 is made of dielectric ceramics and includes a multi-layer chip 16 and side margins 17.

The multi-layer chip 16 has a configuration in which a plurality of flat plate-like ceramic layers extending along the X-Y plane are laminated in the Z-axis direction. The multi-layer chip 16 includes a capacitance forming unit 18 and two covers 19. The covers 19 cover the capacitance forming unit 18 in the Z-axis direction from above and below.

The capacitance forming unit 18 includes a plurality of first internal electrodes 12 and a plurality of second internal electrodes 13. The first and second internal electrodes 12 and 13 each have a sheet-like shape extending along the X-Y plane. In the capacitance forming unit 18, the first and second internal electrodes 12 and 13 are alternately laminated in the Z-axis direction while sandwiching a plurality of ceramic layers therebetween. The capacitance forming unit 18 has a function of storing charge in the multi-layer ceramic capacitor 10.

The first and second internal electrodes 12 and 13 are formed over the entire width of the capacitance forming unit 18 in the Y-axis direction, and the positions of the end portions of the first and second internal electrodes 12 and 13 in the Y-axis direction are aligned with one another along the Y-axis direction within the range of 0.5 μm. The first and second internal electrodes 12 and 13 are each made of a good conductor of electricity. Examples of the good conductor of electricity forming the first and second internal electrodes 12 and 13 typically include nickel (Ni), and other than nickel (Ni), include a metal or alloy mainly containing copper (Cu), palladium (Pd), platinum (Pt), silver (Ag), gold (Au), or the like.

The first internal electrodes 12 extend in the X-axis direction to the end surface 11a that comes into contact with the first external electrode 14 and are apart from the second external electrode 15. The second internal electrodes 13 extend in the X-axis direction to the end surface 11a that comes into contact with the second external electrode 15 and are apart from the first external electrode 14. Accordingly, the first internal electrodes 12 are connected to only the first external electrode 14, and the second internal electrodes 13 are connected to only the second external electrode 15.

With such a configuration, when a voltage is applied between the first external electrode 14 and the second external electrode 15 in the multi-layer ceramic capacitor 10, the voltage is applied to the plurality of ceramic layers between the first internal electrodes 12 and the second internal electrodes 13. Accordingly, the multi-layer ceramic capacitor 10 stores charge corresponding to the voltage applied between the first external electrode 14 and the second external electrode 15.

In the ceramic body 11, in order to increase capacitances of the ceramic layers provided between the first internal electrodes 12 and the second internal electrodes 13, dielectric ceramics having a high dielectric constant is used. For the dielectric ceramics having a high dielectric constant, for example, a material having a Perovskite structure containing barium (Ba) and titanium (Ti), which is typified by barium titanate ($BaTiO_3$), is used.

It should be noted that the ceramic layer may be made of a strontium titanate ($SrTiO_3$) based material, a calcium titanate ($CaTiO_3$) based material, a magnesium titanate ($MgTiO_3$) based material, a calcium zirconate ($CaZrO_3$) based material, a calcium zirconate titanate ($Ca(Zr,Ti)O_3$) based material, a barium zirconate ($BaZrO_3$) based material, a titanium oxide ($TiO_2$) based material, or the like.

The covers 19 and the side margins 17 have functions of protecting the periphery of the capacitance forming unit 18 and ensuring insulation properties of the first and second internal electrodes 12 and 13. The covers 19 and the side margins 17 may be made of insulating ceramics different from that of the ceramic layers. However, from the viewpoint of suppression of internal stress in the ceramic body 11, the covers 19 and the side margins 17 are favorably made of dielectric ceramics similar to that of the ceramic layers.

The covers 19 cover the capacitance forming unit 18 in the Z-axis direction. The surfaces of the covers 19, which face in the Z-axis direction, form the main surfaces 11c of the ceramic body 11. As shown in FIG. 3, a thickness dimension D2 of the cover 19 along the Z-axis direction is, for example, 20 μm or less, and favorably 10 μm or more and 20 μm or less. The thickness dimension D2 is a dimension along the Z-axis direction from the center portion of the main surface 11c in the X- and Y-axis directions to the capacitance forming unit 18.

The side margins 17 cover the multi-layer chip 16, i.e., the capacitance forming unit 18 and the covers 19, in the Y-axis direction. The surfaces of the side margins 17 that face in the Y-axis direction form the side surfaces 11b of the ceramic body 11. Further, each of the side margins 17 also forms the corner portions R4 formed at the four corners of the side surfaces 11b. As shown in FIG. 3, a thickness dimension D3 of the side margin 17 along the Y-axis direction is, for example, 20 μm or less, and favorably 10 μm or more and 20 μm or less. The thickness dimension D3 is a dimension along the Y-axis direction from the center portion of the side surface 11b in the X- and Z-axis directions to the capacitance forming unit 18.

In such a manner, in the multi-layer ceramic capacitor 10, the thickness dimensions D2 and D3 of the covers 19 and the side margins 17 can be sufficiently thinned, and the ceramic body 11 can be miniaturized while sufficiently ensuring the intersectional area and the number of layers of the first and second internal electrodes 12 and 13 in the capacitance forming unit 18. Additionally, since the thickness dimensions D1 of each of the first and second external electrodes 14 and 15 can also be thinned, the entire multi-layer ceramic capacitor 10 can be further miniaturized. Therefore, the multi-layer ceramic capacitor 10 having a small size and a large capacitance can be achieved.

Hereinafter, a method of producing the multi-layer ceramic capacitor 10 will be described in detail.

2. METHOD OF PRODUCING MULTI-LAYER CERAMIC CAPACITOR 10

Figure 5:
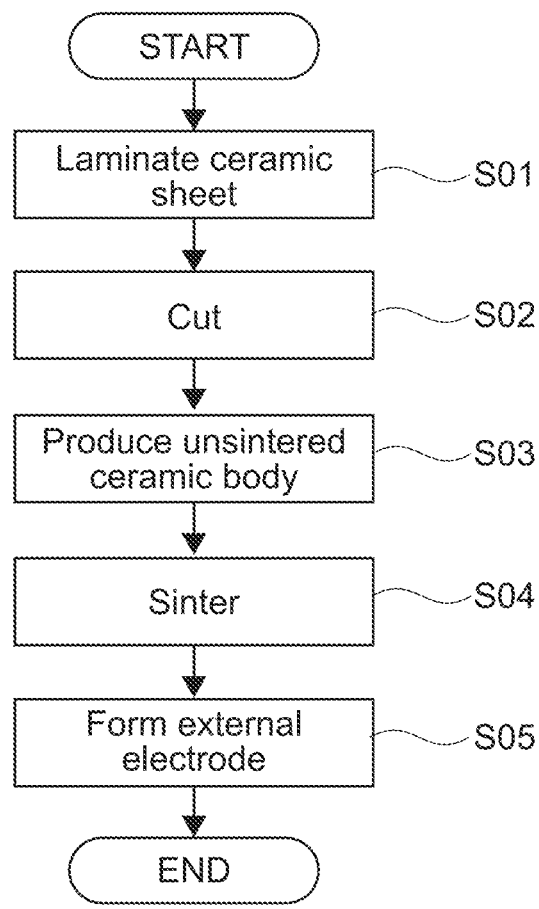
FIG. 5 is a flowchart showing a method of producing the multi-layer ceramic capacitor.
Figure 6:
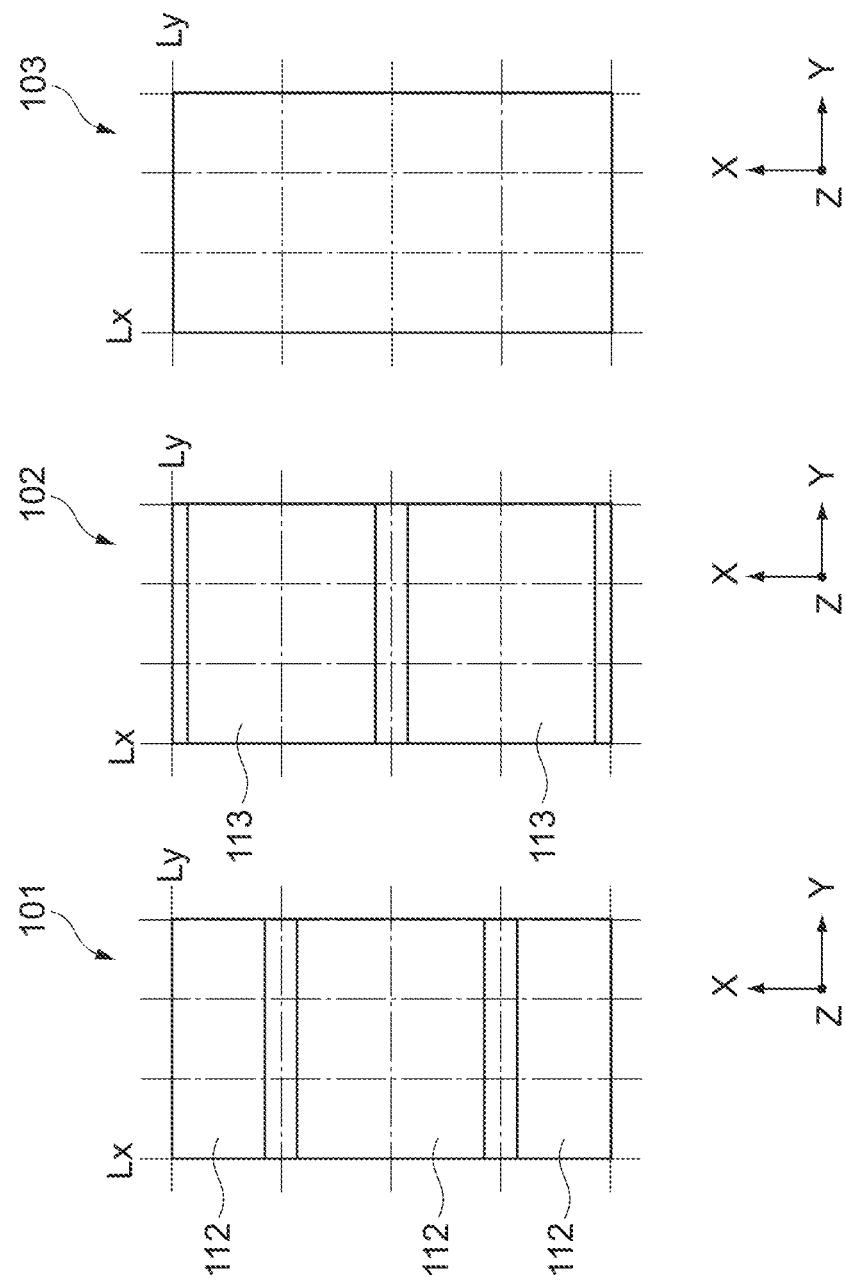
FIGS. 6A, 6B, and 6C are each a plan view showing a production process of the multi-layer ceramic capacitor.

FIG. 5 is a flowchart showing a method of producing the multi-layer ceramic capacitor 10. FIGS. 6A to 12 are views each schematically showing a production process of the multi-layer ceramic capacitor 10. Hereinafter, the method of producing the multi-layer ceramic capacitor 10 will be described along FIG. 5 with reference to FIGS. 6A to 12 as appropriate.

2.1 Step S01: Lamination of Ceramic Sheet

In Step S01, first ceramic sheets 101 and second ceramic sheets 102 for forming the capacitance forming unit 18, and third ceramic sheets 103 for forming the covers 19 are prepared and then laminated.

The first, second, and third ceramic sheets 101, 102, and 103 are configured as unsintered dielectric green sheets mainly containing dielectric ceramics. The first, second, and third ceramic sheets 101, 102, and 103 are each formed into a sheet shape by using a roll coater or a doctor blade, for example. The thickness of each of the first, second, and third ceramic sheets 101, 102, and 103 is adjustable as appropriate.

FIGS. 6A, 6B, and 6C are plan views of the first, second, and third ceramic sheets 101, 102, and 103, respectively. At this stage, the first, second, and third ceramic sheets 101, 102, and 103 are each configured as a large-sized sheet that is not singulated. FIGS. 6A, 6B, and 6C each show cutting lines Lx and Ly used when the sheets are singulated into the multi-layer ceramic capacitors 10. The cutting lines Lx are parallel to the X axis, and the cutting lines Ly are parallel to the Y axis.

Unsintered first internal electrodes 112 corresponding to the first internal electrodes 12 are formed on the first ceramic sheet 101, and unsintered second internal electrodes 113 corresponding to the second internal electrodes 13 are formed on the second ceramic sheet 102. It should be noted that no internal electrodes are formed on the third ceramic sheet 103 corresponding to the cover 19.

The first internal electrodes 112 and the second internal electrodes 113 can be formed by applying an optional electrically conductive paste to the first ceramic sheets 101 and the second ceramic sheets 102, respectively. A method of applying the electrically conductive paste can be optionally selected from well-known techniques. For example, for the application of the electrically conductive paste, a screen printing method or a gravure printing method can be used.

The first internal electrodes 112 and the second internal electrodes 113 are patterned into a plurality of belt-like shapes extending along the Y-axis direction. Each of the belt-like patterns extends across the cutting lines Lx and along the single cutting line Ly. The belt-like patterns adjacent to each other are disposed apart from each other in the X-axis direction with the single cutting line Ly intervening therebetween.

Figure 7:
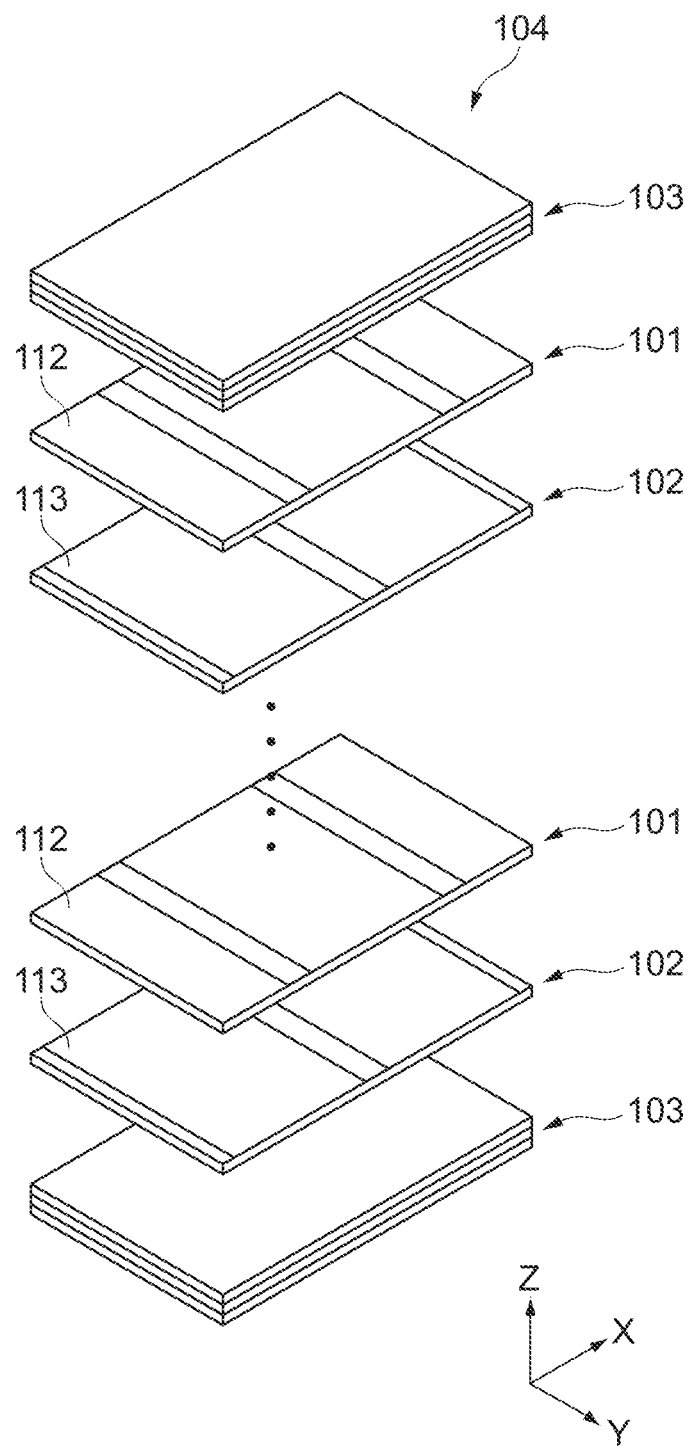
FIG. 7 is a perspective view showing a production process of the multi-layer ceramic capacitor.

Those first, second, and third ceramic sheets 101, 102, and 103 are laminated as shown in FIG. 7, to produce a multi-layer sheet 104. In other words, the first ceramic sheets 101 and the second ceramic sheets 102 are alternately laminated, and the third ceramic sheets 103 are laminated on the upper and lower surfaces of the laminate of those first and second ceramic sheets 101 and 102 in the Z-axis direction.

The number of third ceramic sheets 103 is not limited to the example shown in FIG. 7 and can be adjusted such that the thickness dimension of the cover 19, which is to be obtained after sintering, along the Z-axis direction is 20 μm or less, for example.

The multi-layer sheet 104 is integrated by pressure-bonding the first, second, and third ceramic sheets 101, 102, and 103. For the pressure-bonding of the first, second, and third ceramic sheets 101, 102, and 103, for example, hydrostatic pressing or uniaxial pressing is favorably used. This makes it possible to obtain a high-density multi-layer sheet 104.

2.2 Step S02: Cutting

Figure 8:
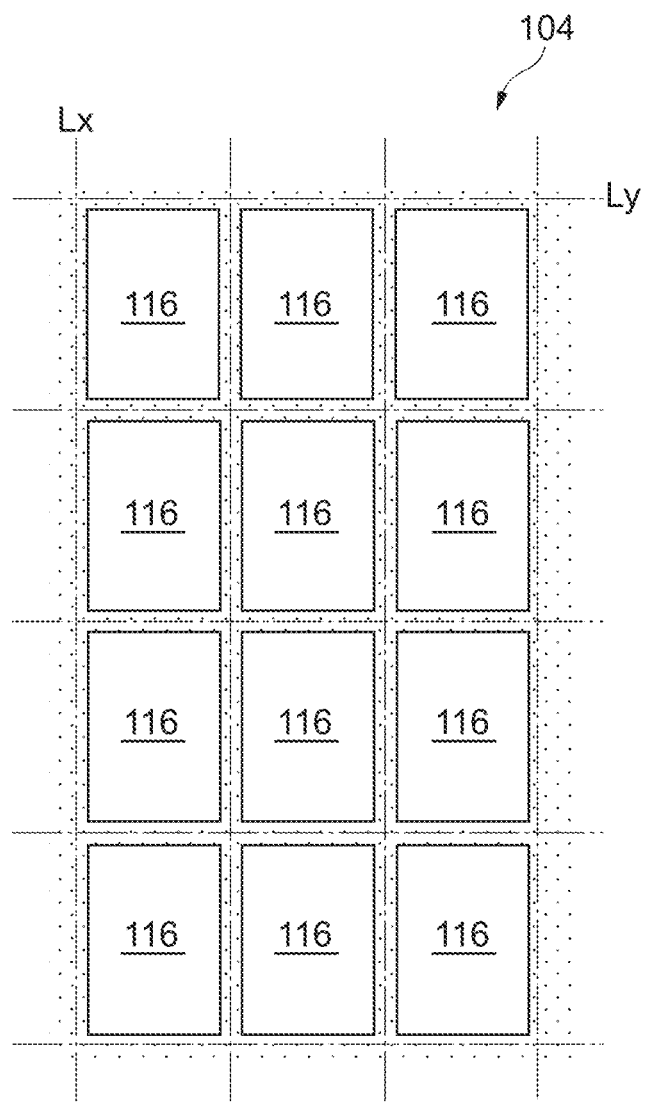
FIG. 8 is a plan view showing a production process of the multi-layer ceramic capacitor.

In Step S02, the multi-layer sheet 104 obtained in Step S01 is cut along the cutting lines Lx and Ly as shown in FIG. 8, to produce an unsintered multi-layer chip 116. The multi-layer chip 116 corresponds to the multi-layer chip 16 obtained after sintering. For cutting of the multi-layer sheet 104, for example, a push-cutting blade or a rotary blade can be used.

Figure 9:
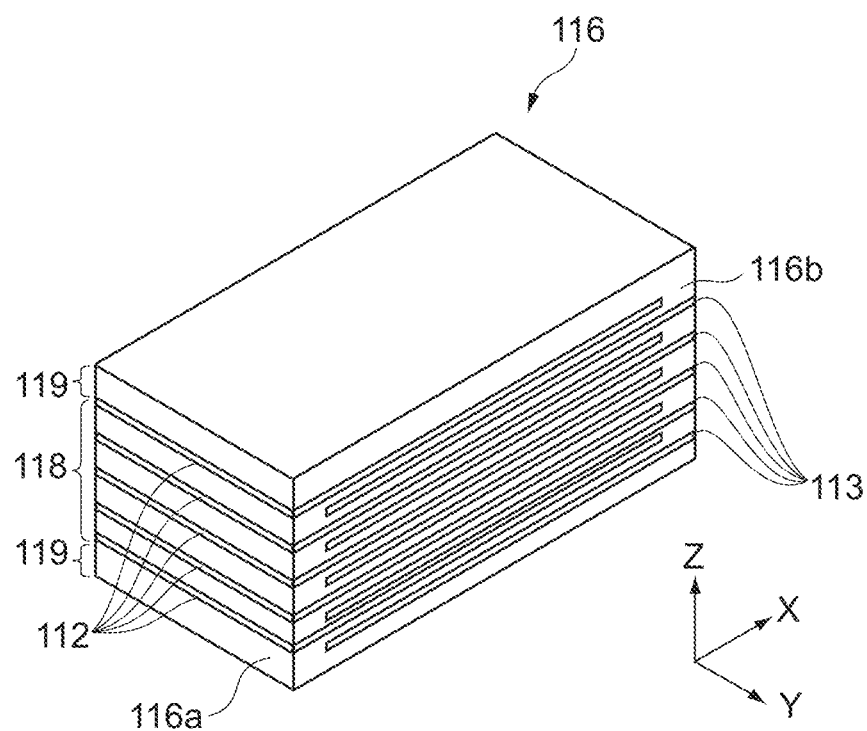
FIG. 9 is a perspective view showing a production process of the multi-layer ceramic capacitor.

As shown in FIG. 9, the multi-layer chip 116 includes an unsintered capacitance forming unit 118 corresponding to the capacitance forming unit 18 and unsintered covers 119 corresponding to the covers 19. The capacitance forming unit 118 includes the first and second internal electrodes 112 and 113 alternately laminated between the green sheets corresponding to the ceramic layers.

The multi-layer chip 116 has first cut surfaces 116a formed by cutting along the cutting lines Ly, and second cut surfaces 116b formed by cutting along the cutting lines Lx. The first cut surface 116a faces in the X-axis direction, and end portions of either the first internal electrodes 112 or the second internal electrodes 113 in the X-axis direction are exposed from the first cut surface 116a. The second cut surface 116b faces in the Y-axis direction, and end portions of both of the first and second internal electrodes 112 and 113 in the Y-axis direction are exposed from the second cut surface 116b, the first and second internal electrodes 112 and 113 being alternately disposed in the Z-axis direction.

2.3 Step S03: Production of Unsintered Ceramic Body

Figure 10:
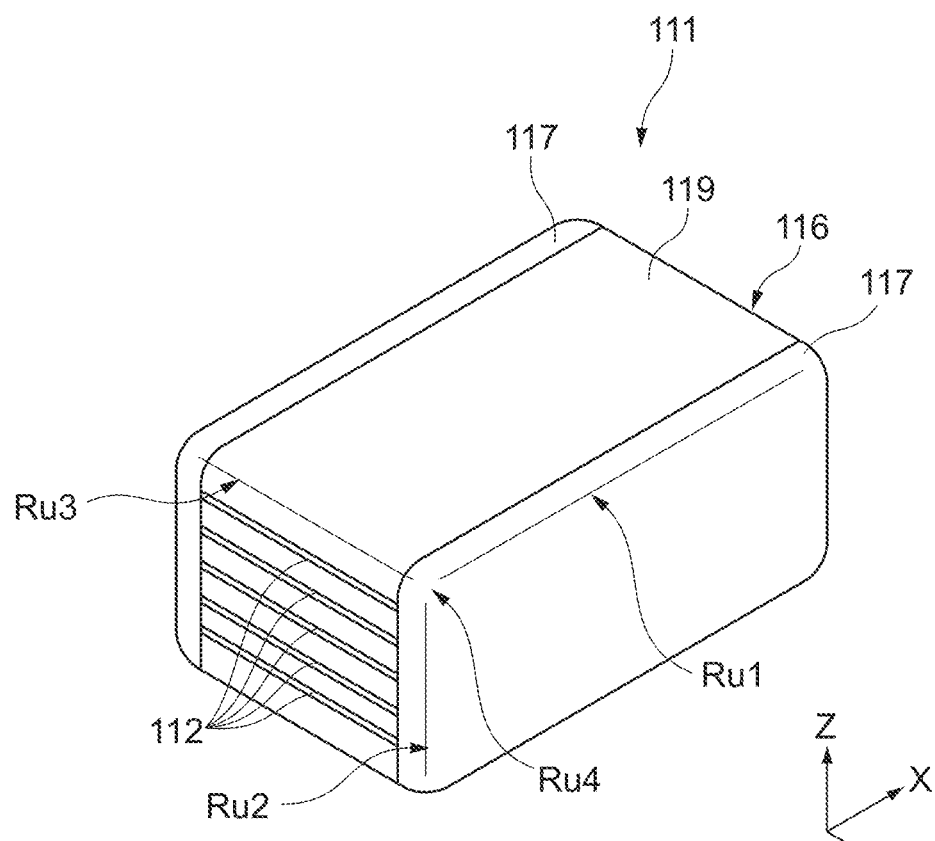
FIG. 10 is a perspective view showing a production process of the multi-layer ceramic capacitor.

In Step S03, unsintered side margins 117 are provided to the multi-layer chip 116 obtained in Step S02, to produce an unsintered ceramic body 111 shown in FIG. 10.

The side margins 117 are provided to the second cut surfaces 116b from which both the first and second internal electrodes 112 and 113 are exposed. The side margin 117 is formed by pressing and punching a ceramic sheet for forming the side margins 117 in the Y-axis direction by the second cut surface 116b of the multi-layer chip 116. By the adjustment of the thickness of the ceramic sheet, for example, the thickness dimension of the side margin 17 to be obtained after sintering can be set to 20 μm or less.

Additionally, the multi-layer chip 116 to which the side margins 117 are provided is subjected to barrel polishing, so that the outer edges of the side margins 117 and the covers 119 are polished. Accordingly, the unsintered ceramic body 111 including rounded ridge portions Ru1, Ru2, and Ru3 and corner portions Ru4 is formed.

The barrel polishing is performed under the condition where the corners of the side margins 117 and the covers 119 are chamfered such that the first and second internal electrodes 112 and 113 are not exposed from both the side surfaces facing in the Y-axis direction or from both the main surfaces facing in the Z-axis direction. In the unsintered ceramic body 111 in which the side margins 117 and the covers 119 are made thin, those corners are difficult to largely trim. Therefore, in the ceramic body 111, the ridge portions Ru1, Ru2, and Ru3 and the corner portions Ru4, which are slightly chamfered and each have a squared appearance, are formed.

It should be noted that the corner portions Ru4 and the ridge portions Ru1, Ru2, and Ru3 are rounded in a broad perspective, but fine irregularities are formed in the corner portions Ru4 and the ridge portions Ru1, Ru2, and Ru3 in a microscopic perspective. Details of the irregularities will be described later.

2.4 Step S04: Sintering

In Step S04, the unsintered ceramic body 111 obtained in Step S03 is sintered, to produce the ceramic body 11 of the multi-layer ceramic capacitor 10 shown in FIGS. 1 to 3. Sintering can be performed in a reduction atmosphere or a low-oxygen partial pressure atmosphere, for example. A sintering temperature can be determined on the basis of a sintering temperature of the ceramic body 111.

2.5 Step S05: Formation of External Electrode

In Step S05, an electrically conductive paste is applied so as to cover the end surfaces 11a and the corner portions R4 of the ceramic body 11 obtained in Step S04. The electrically conductive paste can be applied by a dip method of immersing each end portion of the ceramic body 11 in the X-axis direction into the electrically conductive paste.

The applied electrically conductive paste is baked in a reduction atmosphere or a low-oxygen partial pressure atmosphere, for example. Accordingly, the first and second external electrodes 14 and 15 are formed, so that the multi-layer ceramic capacitor 10 shown in FIGS. 1 to 3 is produced. Additionally, one or more plating films may be formed using the baked first and second external electrodes 14 and 15 as base layers.

Figure 11:
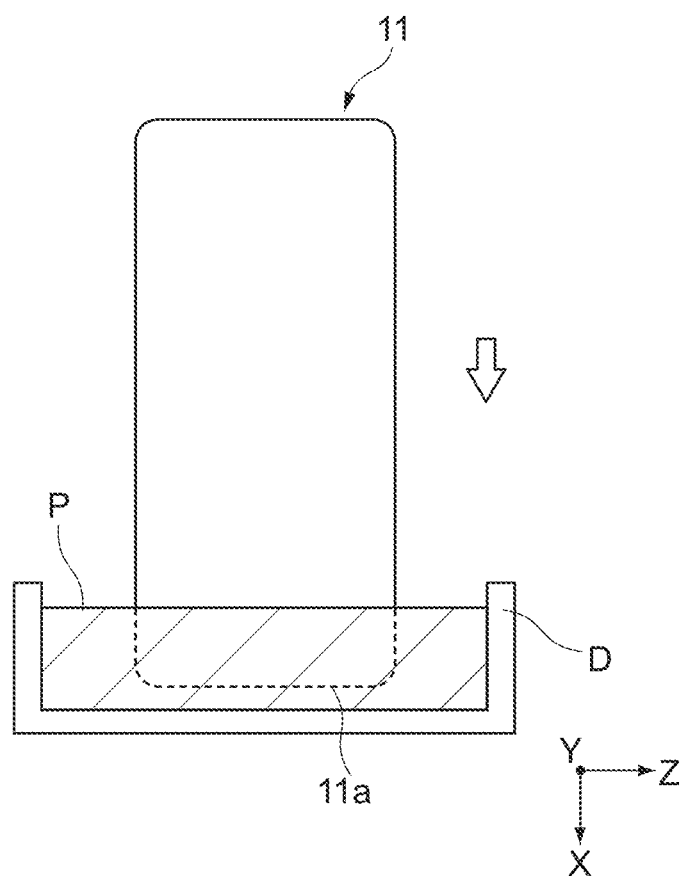
FIG. 11 is a cross-sectional view showing a production process of the multi-layer ceramic capacitor.
Figure 12:
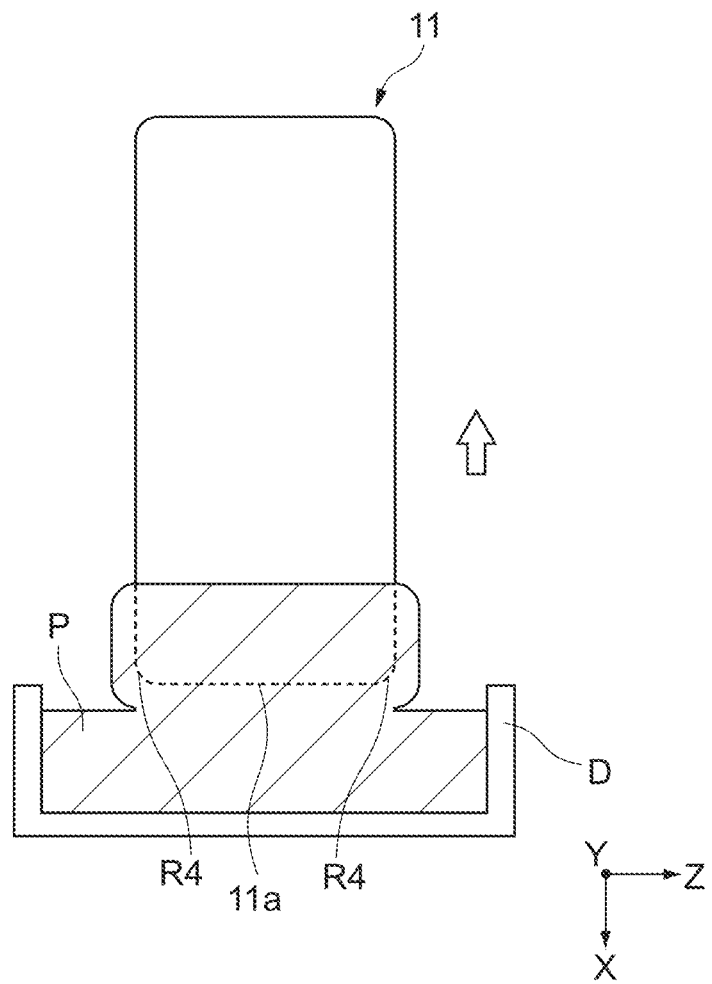
FIG. 12 is a cross-sectional view showing a production process of the multi-layer ceramic capacitor.

FIGS. 11 and 12 are views for describing a process of forming the first and second external electrodes 14 and 15.

As shown in FIG. 11, the end surface 11a and the corner portions R4 of the ceramic body 11, to which an electrically conductive paste P is to be applied, are immersed into the electrically conductive paste P filled in a dip tank D.

The electrically conductive paste P is formed as a slurry material in which metal powder, a binder, an organic solvent, and the like are mixed. The composition of the electrically conductive paste P is adjusted as appropriate such that a desired electrode shape and function are obtained.

Subsequently, as shown in FIG. 12, the end surface 11a and the corner portions R4 of the ceramic body 11 are pulled up from the dip tank D. The film thickness of the electrically conductive paste P can be controlled by the viscosity of the electrically conductive paste P or a speed at which the ceramic body 11 is pulled up. Accordingly, the first and second external electrodes 14 and 15, each of which has the thickness dimension D1 of 10 µm or less, for example, can be formed.

Since the electrically conductive paste P is stretched in the form of a drop when the ceramic body 11 is pulled up, the electrically conductive paste P applied is thickest at the center portion of the end surface 11a. Meanwhile, the electrically conductive paste P is likely to flow at the corner portions R4 that protrude outward, and the electrically conductive paste P applied there becomes thinner than that applied at the center portion of the end surface 11a. Thus, in a case where the thickness dimension D1 of each of the first and second external electrodes 14 and 15 is controlled to be 10 µm or less, the film thickness at the corner portions R4 becomes further thinner, and there arises a concern that the corner portions R4 are exposed from the first and second external electrodes 14 and 15.

Examples of a method of inhibiting the corner portions R4 from being exposed include a method of largely trimming the corner portions R4 by barrel polishing and giving gentle curves to the corner portions R4. However, in a case where the side margins 17 and the covers 19 each have a small thickness dimension, e.g., 20 µm or less, if the corner portions R4 are largely trimmed, the first and second internal electrodes 12 and 13 may be exposed and this may lead to a problem such as a short circuit between the first and second internal electrodes 12 and 13 or reduction in environment resistance.

In this embodiment, in order to sufficiently ensure the coatability of the first and second external electrodes 14 and 15 while inhibiting the first and second internal electrodes 12 and 13 from being exposed, the corner portions R4 are configured as follows.

3. DETAILED CONFIGURATION OF CORNER PORTION R4

Figure 13:
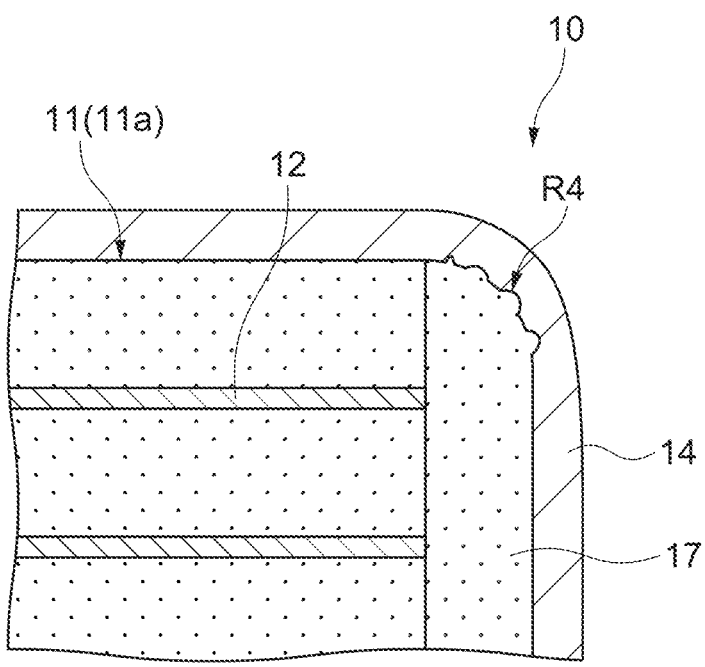
FIG. 13 is a partially enlarged view of FIG. 4.

FIG. 13 is a partially enlarged view of FIG. 4 showing the corner portion R4.

The corner portion R4 of this embodiment has the surface roughness Ra of 30 nm or more and has fine irregularities. When the corner portion R4 has irregularities that meet the condition of the above-mentioned surface roughness Ra, the flow of the electrically conductive paste P is restricted by the minute irregularities of the corner portion R4, so that the electrically conductive paste P can easily stay at the corner portion R4. Therefore, even when the thickness dimension of each of the first and second external electrodes 14 and 15 is small, e.g., 10 µm or less, and the curve of the corner portion R4 is sharp, the first and second external electrodes 14 and 15 can reliably cover the corner portions R4.

It should be noted that the surface roughness Ra in this embodiment is assumed as an arithmetic mean roughness Ra that is calculated on the basis of JIS B 0601:2013.

In this embodiment, when a ceramic sheet 117s for forming the side margin 117 is pressed and punched by the second cut surface 116b of the multi-layer chip 116, the irregularity shapes described above can be given without largely trimming the corner portions Ru4.

Hereinafter, a method of forming the corner portion R4 of this embodiment will be described in details.

Figure 14:
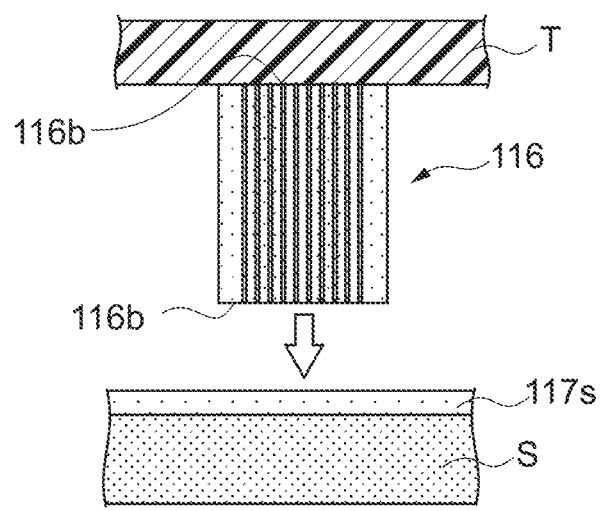
FIG. 14 is a cross-sectional view showing a production process of the multi-layer ceramic capacitor.
Figure 15:
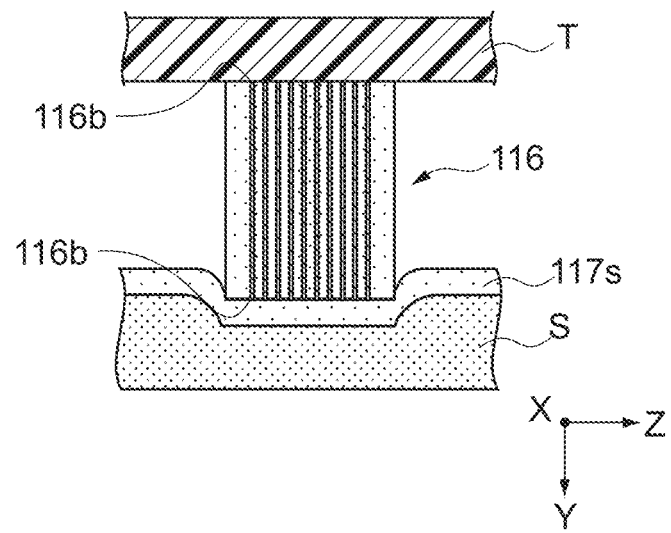
FIG. 15 is a cross-sectional view showing a production process of the multi-layer ceramic capacitor.
Figure 16:
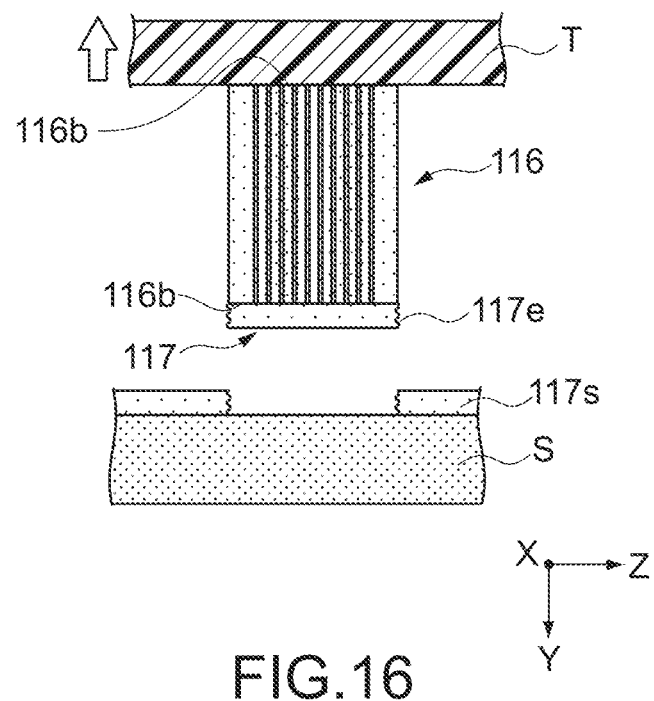
FIG. 16 is a cross-sectional view showing a production process of the multi-layer ceramic capacitor.

FIGS. 14 to 16 are views for describing a process of punching the ceramic sheet 117s in Step S03.

First, as shown in FIG. 14, the ceramic sheet 117s is disposed on a flat plate-like base member S made of an elastic body. One of the second cut surfaces 116b of the multi-layer chip 116 is held with a tape T such that the other second cut surface 116b is caused to face the ceramic sheet 117s in the Y-axis direction.

Next, as shown in FIG. 15, the ceramic sheet 117s is pressed by the second cut surface 116b of the multi-layer chip 116 in the Y-axis direction. The multi-layer chip 116 locally sinks deep into the base member S together with the ceramic sheet 117s. Accordingly, a shear force acts on the ceramic sheet 117s.

When the shear force has shear strength equal to or larger than that of the ceramic sheet 117s, the ceramic sheet 117s is punched as shown in FIG. 16. Accordingly, the side margin 117 having a shear surface 117e is formed.

Figure 17:
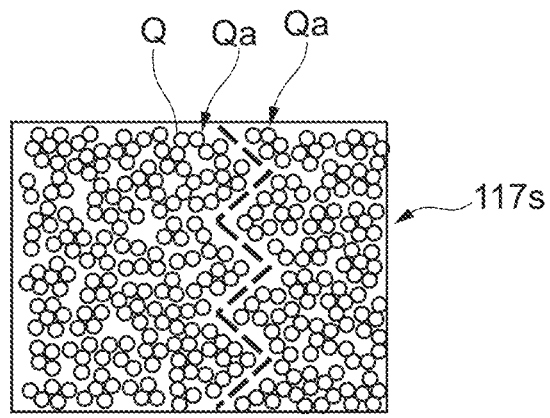
FIG. 17 is a view schematically showing a part of a ceramic sheet for forming a side margin, which is used in a production process of the multi-layer ceramic capacitor.

FIG. 17 is a schematic view showing a part of the ceramic sheet 117s in an enlarged manner.

The ceramic sheet 117s is obtained by mixing ceramic particles Q, a binder, an organic solvent, and the like to form ceramic slurry, and drying the ceramic slurry to be molded into a sheet. In the ceramic sheet 117s, the ceramic particles Q are not sufficiently dispersed, and a lot of agglomerations Qa of the ceramic particles Q are formed. The agglomeration degree of the ceramic particles Q can be adjusted by an agitation condition or a composition of the ceramic slurry.

In the ceramic sheet 117s, the shear strength between the agglomerations Qa is smaller than that within the agglomerations Qa. Because of this, when the shear force along the outer edge of the second cut surface 116b is applied to the ceramic sheet 117s by the press of the multi-layer chip 116, as indicated by the broken line of FIG. 17, the ceramic sheet 117s is sheared in a region between the agglomerations Qa.

Figure 18:
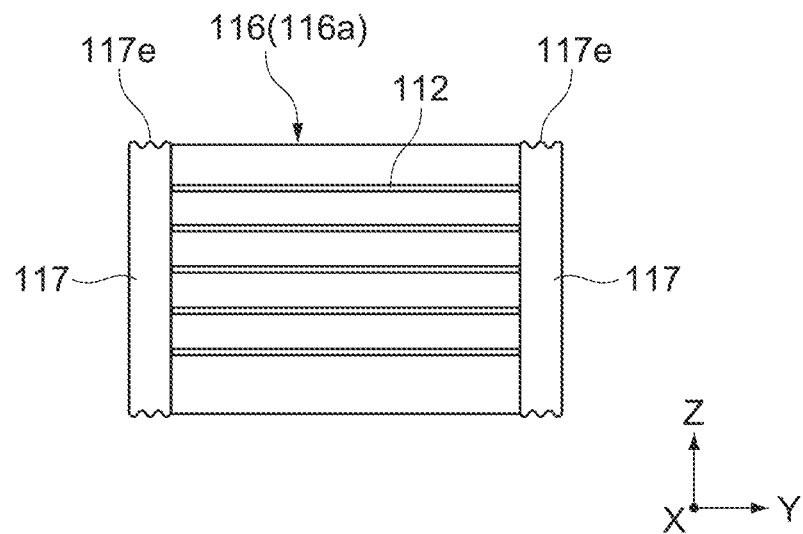
FIG. 18 is a side view showing a production process of the multi-layer ceramic capacitor.

As a result, as shown in FIG. 18, in the shear surfaces 117e of the side margins 117 obtained immediately after the punching, irregularities corresponding to the shapes and distribution of the agglomerations Qa are formed.

Subsequently, as described above, the multi-layer chip 116 provided with the side margins 117 is subjected to barrel polishing, to form the unsintered ceramic body 111. Accordingly, as shown in FIGS. 4 and 13, the corner portion R4 that is chamfered in a broad perspective and has irregularities resulting from the agglomerations Qa of the ceramic sheet 117s in a microscopic perspective are formed.

Figure 19:
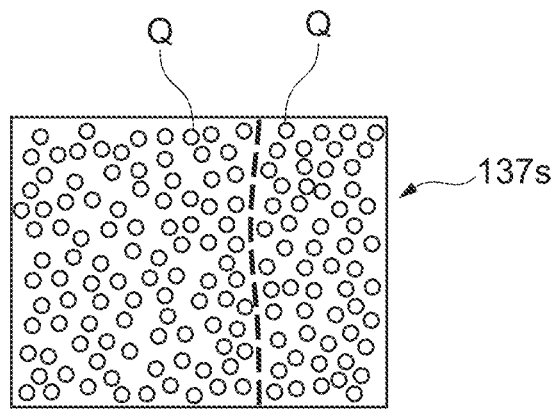
FIG. 19 is a view schematically showing a part of a ceramic sheet for forming a side margin according to Comparative examples of the embodiment.

Meanwhile, as shown in FIG. 19, a ceramic sheet 137s in which the ceramic particles Q are dispersed and agglomerations are not formed has substantially uniform shear strength as a whole. Accordingly, when the shear force along the outer edge of the second cut surface 116b is applied to the ceramic sheet 137s by the press of the multi-layer chip 116, as indicated by the broken line of FIG. 19, the ceramic sheet 137s is sheared along the outer edge of the second cut surface 116b.

Figure 20:
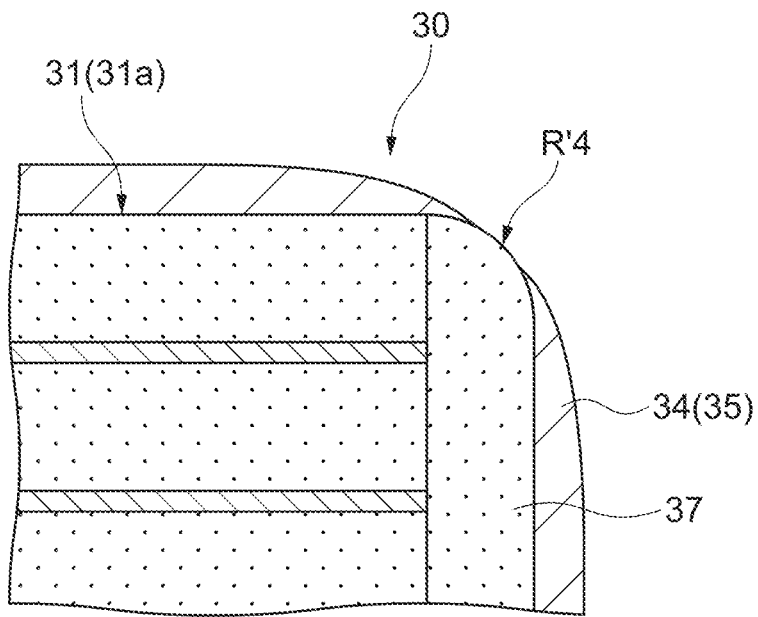
FIG. 20 is an enlarged cross-sectional view of a multi-layer ceramic capacitor according to Comparative examples of the embodiment, the multi-layer ceramic capacitor being cut at a position similar to that in FIG. 13.

When the ceramic sheet 137s described above is used, a ceramic body 31 as shown in FIG. 20, which has smooth corner portions R'4 each having a surface roughness Ra less than 30 nm, is produced.

In the ceramic body 31, in the process of forming external electrodes 34 and 35 in Step S05, the electrically conductive paste is difficult to stay at the corner portions R'4, and the external electrodes 34 and 35 are disconnected there. Accordingly, a multi-layer ceramic capacitor 30 having a shape in which the corner portions R'4 are exposed is formed. This causes a trouble such as infiltration of a plating solution into the ceramic body 31, the plating solution being used for forming plating films to be formed on the external electrodes 34 and 35.

In this embodiment, the ceramic particles Q of the ceramic sheet 117s are intended to be ununiformly distributed, so that minute irregularities can be given to the corner portions R4. Accordingly, it is possible to inhibit the corner portions R4 from being exposed from the first and second external electrodes 14 and 15 and inhibit the above-mentioned trouble from occurring.

Further, when the agglomeration degree of the ceramic particles Q in the ceramic sheet 117s is adjusted, the surface roughness Ra of the corner portion R4 can be controlled. Accordingly, the surface roughness Ra can be controlled without depending on the surface treatment of the ceramic body 11. Therefore, it is possible to maximally ensure the intersectional area and the number of layers of the first and second internal electrodes 12 and 13 and produce a multi-layer ceramic capacitor 10 having a small size, a large capacitance, and high reliability.

Other than the above method, examples of methods of controlling the surface roughness Ra of the corner portions R4 by the ceramic sheet 117s include a method of adjusting a ratio of at least one of a binder or a plasticizer to the ceramic particles.

Further, since the ridge portions R1 and R2 and the corner portions R4 are all formed by the cut surfaces of the ceramic sheet 117s and are trimmed by barrel polishing in a similar manner, it is assumed that the ridge portions R1 and R2 and the corner portions R4 have substantially the same surface roughness Ra. Therefore, as a value of the surface roughness Ra of the corner portion R4, the value of the surface roughness Ra of the first ridge portion R1 that is not covered with each of the first and second external electrodes 14 and 15 may be used instead.

4. EXAMPLES AND COMPARATIVE EXAMPLES

As Examples and Comparative examples of this embodiment, samples of the multi-layer ceramic capacitor were produced by the production method described above. Those samples were designed such that the dimension of a ceramic body, which is to be obtained after sintering, in the X-axis direction is set to 1 mm, and the dimensions thereof in the Y- and Z-axis directions are set to 0.5 mm. Further, any of the samples was formed such that the thickness dimension D2 of the cover 19 is 20 μm and the thickness dimension D3 of the side margin 17 is 20 μm.

First, on the basis of Steps S01 and S02 described above, an unsintered multi-layer chip was produced. Subsequently, on the basis of Step S03 described above, a ceramic sheet formed by mixing ceramic particles, a binder, a plasticizer, and the like was prepared and then punched by the cut surface of the multi-layer chip. At that time, by changing the composition of the ceramic slurry forming the ceramic sheet and the condition for agitation or the like, 6 types of samples, which are different from one another in roughness of the shear surface, were produced.

Subsequently, those types of samples were subjected to barrel polishing under the same conditions, and sintering and formation of external electrodes were performed on the basis of Steps S04 and S05 described above. The external electrodes were formed such that the thickness dimension to be obtained after baking is set to 10 μm or less. Accordingly, 6 types of samples of the multi-layer ceramic capacitor 10 (Examples 1 to 4 and Comparative examples 1 and 2), which are different from one another in surface roughness Ra of the corner portion, were produced.

Subsequently, the surface roughness Ra of the corner portion was evaluated for the samples of Examples 1 to 4 and Comparative examples 1 and 2. The surface roughness Ra was a mean value of measured values of 10 samples picked at random out of 1,000 or more samples in each of Examples and Comparative examples. This measurement was performed by observing and imaging a cross section in the vicinity of the end surface of the ceramic body with a scanning electron microscope (SEM) and performing image analysis on the captured image. Table 1 shows the results.

TABLE 1

| Sample | Surface roughness of corner portion [nm] | Coatability of external electrode |
| --- | --- | --- |
| Comparative example 1 | 10 | B |
| Comparative example 2 | 20 | B |
| Example 1 | 30 | A |
| Example 2 | 70 | A |
| Example 3 | 110 | A |
| Example 4 | 300 | A |

As shown in Table 1, the surface roughness Ra of the corner portion was 30 nm in Example 1, 70 nm in Example 2, 110 nm in Example 3, 300 nm in Example 4, 10 nm in Comparative example 1, and 20 nm in Comparative example 2.

Additionally, the first and second external electrodes 14 and 15 in Examples 1 to 4 and Comparative examples 1 and 2 were observed with an optical microscope, and the coatability of the first and second external electrodes 14 and 15 at the corner portion was evaluated. This evaluation was performed on 200 samples picked at random out of 1,000 or more samples in each of Examples and Comparative examples. Out of those 200 samples, if the corner portions are covered with the external electrodes in all of the samples, those samples were determined as A, and if there is one or more samples in which the corner portions are not covered with the external electrodes, those samples were determined as B. Table 1 shows the results.

Regarding the coatability of the external electrode at the corner portion, Examples 1 to 4 in which the surface roughness Ra is 30 nm or more and 300 nm or less were determined as A. Meanwhile, Comparative examples 1 and 2 in which the surface roughness Ra is 10 nm and 20 nm were determined as B, because there were samples in which the corner portions were not covered with the external electrodes.

From the above, it was confirmed that when the surface roughness Ra of the corner portion is set to 30 nm or more, the external electrodes can be uninterruptedly formed even if the thickness of each of the first and second external electrodes 14 and 15 is 10 μm or less.

5. OTHER EMBODIMENTS

Hereinabobve, the embodiment of the present disclosure has been described, but the present disclosure is not limited to the embodiment described above, and it should be appreciated that the present disclosure may be variously modified without departing from the gist of the present disclosure. For example, the embodiment of the present disclosure can be an embodiment obtained by combining embodiments.

For example, part of the processing in Step S05 described above may be performed before Step S04. For example, before Step S04, the unsintered electrode material may be applied to both the end surfaces of the unsintered ceramic body 111 in the X-axis direction, and in Step S04, sintering of the unsintered ceramic body 111 and baking of the unsintered electrode material can be simultaneously performed to form base layers of the first and second external electrodes 14 and 15. Alternatively, the unsintered electrode material may be applied to the ceramic body 111 that has been subjected to debinder processing, and both of them may be sintered at the same time.

It should be noted that the configuration of the multi-layer ceramic capacitor 10 according to this embodiment is not limited to the configuration shown in FIGS. 1 to 3. For example, the number of first and second internal electrodes 12 and 13 can be determined as appropriate according to the size and performance expected for the multi-layer ceramic capacitor 10.

What is claimed is:

1. A multi-layer ceramic capacitor, comprising:
    a ceramic body including
        a multi-layer chip including
            a capacitance forming unit including internal electrodes laminated in a first direction, positions of end portions of the internal electrodes in a second direction being aligned with one another within a range of 0.5 μm in the second direction, the second direction being orthogonal to the first direction, and
            a cover that covers the capacitance forming unit in the first direction, and
        a side margin that covers the multi-layer chip in the second direction,
    the ceramic body having a main surface facing in the first direction, a side surface facing in the second direction, an end surface facing in a third direction orthogonal to the first direction and the second direction, and a corner portion that connects the main surface, the side surface, and the end surface to one another; and
    an external electrode that covers the end surface and the corner portion,
    wherein the corner portion has a surface roughness Ra of 30 nm or more, and
    wherein the surface roughness Ra of the corner portion is larger than a surface roughness Ra of the main surface.

2. The multi-layer ceramic capacitor according to claim 1, wherein
    the corner portion has the surface roughness Ra of 300 nm or less.

3. The multi-layer ceramic capacitor according to claim 1, wherein
    the external electrode has a thickness dimension along the third direction on the end surface, the thickness dimension being 10 μm or less.

4. The multi-layer ceramic capacitor according to claim 1, wherein
    the side margin has a thickness dimension along the second direction, the thickness dimension being 20 μm or less.

5. The multi-layer ceramic capacitor according to claim 1, wherein
    the cover has a thickness dimension along the first direction, the thickness dimension being 20 μm or less.

\* \* \* \* \*